(12) United States Patent
Kinoto et al.

(10) Patent No.: US 9,912,205 B2
(45) Date of Patent: Mar. 6, 2018

(54) ROTOR STRUCTURE FOR ROTARY ELECTRIC MACHINE

(71) Applicant: NISSAN MOTOR CO., LTD., Yokohama-shi, Kanagawa-ken (JP)

(72) Inventors: Takuma Kinoto, Kanagawa (JP); Tatsuya Imai, Kanagawa (JP); Masahide Kimura, Kanagawa (JP); Hideo Sakuyama, Kanagawa (JP); Koichi Murata, Kanagawa (JP); Makoto Abe, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/531,879

(22) PCT Filed: Dec. 3, 2014

(86) PCT No.: PCT/JP2014/081939
§ 371 (c)(1),
(2) Date: May 31, 2017

(87) PCT Pub. No.: WO2016/088213
PCT Pub. Date: Jun. 9, 2016

(65) Prior Publication Data
US 2017/0279323 A1     Sep. 28, 2017

(51) Int. Cl.
*H02K 1/06* (2006.01)
*H02K 1/28* (2006.01)
*H02K 1/27* (2006.01)

(52) U.S. Cl.
CPC ............... *H02K 1/28* (2013.01); *H02K 1/274* (2013.01)

(58) Field of Classification Search
CPC ............ H02K 1/28; H02K 1/274; H02K 1/30; H02K 1/276; H02K 1/27
USPC ............... 310/216.113–216.114, 216.116, 310/216.121–216.123, 216.133
See application file for complete search history.

(56) References Cited

U.S. PATENT DOCUMENTS

| 2003/0001451 | A1* | 1/2003 | Koyanagi | H02K 7/063 310/208 |
| 2006/0138894 | A1* | 6/2006 | Harada | H02K 1/28 310/216.004 |
| 2007/0290566 | A1 | 12/2007 | Mizutani et al. | |

(Continued)

FOREIGN PATENT DOCUMENTS

| JP | 2006-238531 A | 9/2006 |
| JP | 2007-49787 A | 2/2007 |

(Continued)

*Primary Examiner* — Thanh Lam
(74) *Attorney, Agent, or Firm* — Foley & Lardner LLP

(57) ABSTRACT

A rotor structure for a rotary electric machine in which an inner surface of a hollow rotor core and an outer surface of a shaft inserted into a hole of the rotor core are fitted together by mutual engagement between a projection and a recess to compose a rotor, the rotor structure including: a first retainer brought into contact with one end of the rotor core; and a second retainer brought into contact with a surface of the first retainer opposite to a surface in contact with the rotor core so as to fix the first retainer and the rotor core to the shaft, wherein a coefficient of static friction of a first sliding surface between the first retainer and the second retainer is smaller than any other sliding surface provided in the rotor.

8 Claims, 5 Drawing Sheets

(56) References Cited

U.S. PATENT DOCUMENTS

| | | | | |
|---|---|---|---|---|
| 2012/0014823 A1* | 1/2012 | Riedl | ............... | H02K 1/30 |
| | | | | 417/423.12 |
| 2012/0262033 A1* | 10/2012 | Yasuda | ............ | H02K 1/28 |
| | | | | 310/68 B |
| 2013/0187486 A1* | 7/2013 | Lee | ............. | H02K 5/02 |
| | | | | 310/43 |

FOREIGN PATENT DOCUMENTS

| | | |
|---|---|---|
| JP | 2008-109804 A | 5/2008 |
| JP | 2013-158076 A | 8/2013 |

\* cited by examiner

ROTOR STRUCTURE FOR ROTARY ELECTRIC MACHINE

TECHNICAL FIELD

The present invention relates to rotor structures for rotary electric machines, and more particularly to a rotor structure for a rotary electric machine in which a shaft is fitted to a hole of a hollow rotor core and fastened together.

BACKGROUND ART

This type of structure is known in which a rotor core and a shaft are fitted together by mutual engagement between a projection and a recess. This structure uses polymer injected in the engaged portion between the projection and the recess in order to reduce stress caused between the projection and the recess (Patent Literature 1).

CITATION LIST

Patent Literature

Patent Literature 1: Japanese Unexamined Patent Application Publication No. 2007-049787

SUMMARY OF INVENTION

The stress repeatedly applied to the engaged portion may cause a gap between the projection and the recess due to deformation of the injected polymer. The gap caused between the projection and the recess may lead to a reduction in durability of the rotor because of impact derived from unsteadiness between the projection and the recess.

The present invention has been made in view of the above-described conventional problems. An object of the present invention is to provide a rotor structure for a rotary electric machine capable of reducing impact caused between a projection and a recess.

A first aspect of the present invention provides a rotor structure for a rotary electric machine in which an inner surface of a hollow rotor core and an outer surface of a shaft inserted into a hole of the rotor core are fitted together by mutual engagement between a projection and a recess to compose a rotor, the rotor structure including: a first retainer brought into contact with one end of the rotor core; and a second retainer brought into contact with a surface of the first retainer opposite to a surface in contact with the rotor core so as to fix the first retainer and the rotor core to the shaft, wherein a coefficient of static friction of a first sliding surface between the first retainer and the second retainer is smaller than any other sliding surface provided in the rotor.

DESCRIPTION OF EMBODIMENTS

Figure 1:
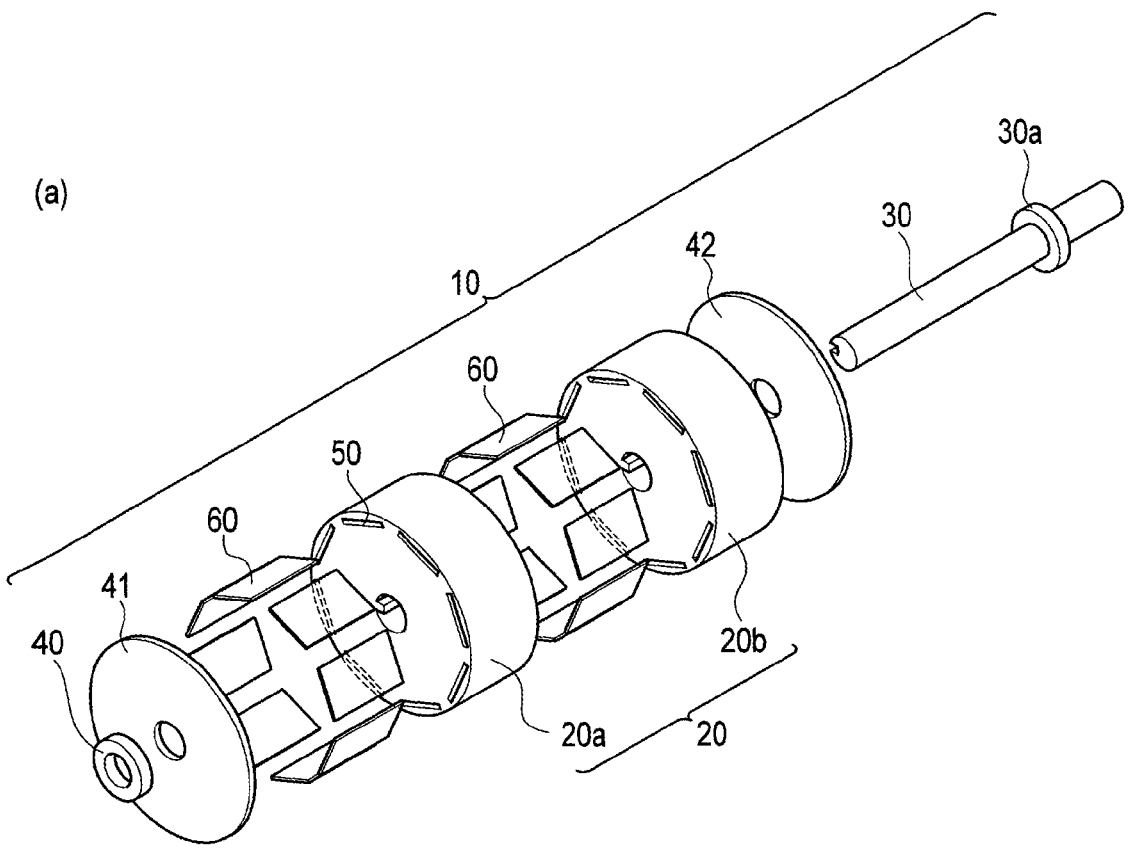
FIG. 1(a) is an exploded view of a rotor according to a first embodiment of the present invention.
FIG. 1(b) is a view showing the assembled rotor according to the first embodiment of the present invention.
Figure 1:
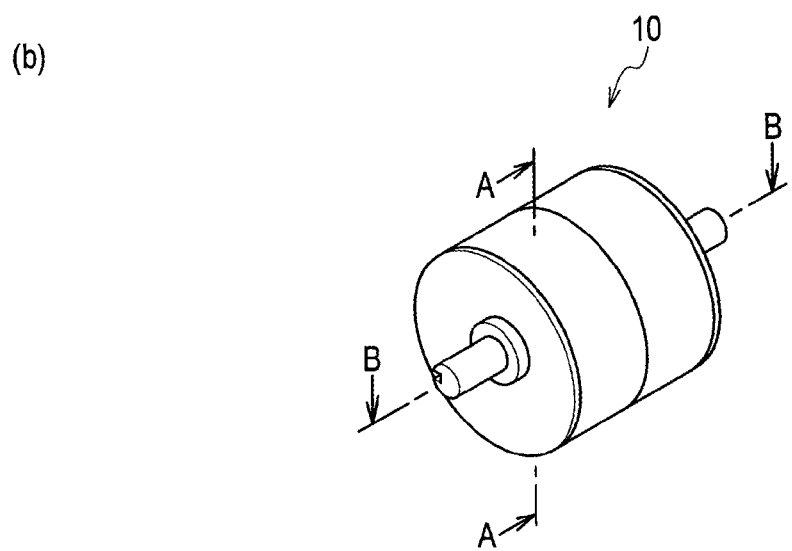

Embodiments of the present invention will be described below with reference to the drawings. The same elements in the explanations of the drawings are designated by the same reference numerals, and explanations thereof are not repeated below.

First Embodiment

A structure of a rotor 10 according to a first embodiment of the present invention is described below with reference to FIG. 1(a) and FIG. 1(b). In the following explanations, the left side in FIG. 1(a) and FIG. 1(b) is referred to as a tip side in an axial direction, and the right side in FIG. 1(a) and FIG. 1(b) is referred to as an end side in the axial direction.

The rotor 10 shown in FIG. 1(a) is an inner rotor placed inside a cylindrical stator (not shown) with a predetermined slight gap provided therebetween, and used for a rotary electric machine (such as a motor and a generator mounted in a vehicle), for example. The rotor 10 includes a hollow rotor core 20, a shaft 30 inserted in the hole of the rotor core 20, permanent magnets 60, and three retainers 40, 41, and 42.

The rotor core 20 includes a plurality of (two in the first embodiment) cylindrical hollow core blocks 20a and 20b aligned in the axial direction of the shaft 30. The core block 20a and the core block 20b each include a plurality of magnet holes 50 into which the permanent magnets 60 are inserted. The core block 20a and the core block 20b are formed of a plurality of electromagnetic steel plates stacked on one another.

The rotor core 20 is brought into contact with both the retainer 41 on the tip side in the axial direction and the retainer 42 on the end side in the axial direction. The retainer 41 is further brought into contact with the surface of the retainer 40 on the opposite side of the surface in contact with the rotor core 20.

The retainers 41 and 42 prevent separation of the respective electromagnetic steel plates caused by magnetic force, and prevent the permanent magnets 60 from dropping off.

The retainer 40 is used for fixing the rotor core 20 and the retainer 41 to the shaft 30, and prevents the shaft 30 from shifting inside the rotor core 20 in the axial direction and coming off the rotor core 20. The retainer 40 may be fastened to the shaft 30 with a ring-shaped member by press fit or shrink fit, or may be formed into a nut and screwed and fastened to the shaft 30 provided with a thread.

The shaft 30 includes a flange 30a. The flange 30a is located on the end side of the shaft 30, and has a larger diameter than the shaft 30. The flange 30a is brought into contact with the surface of the retainer 42 opposite to the surface in contact with the rotor core 20, and prevents the movement of the rotor core 20 toward the end side in the axial direction.

Figure 2:
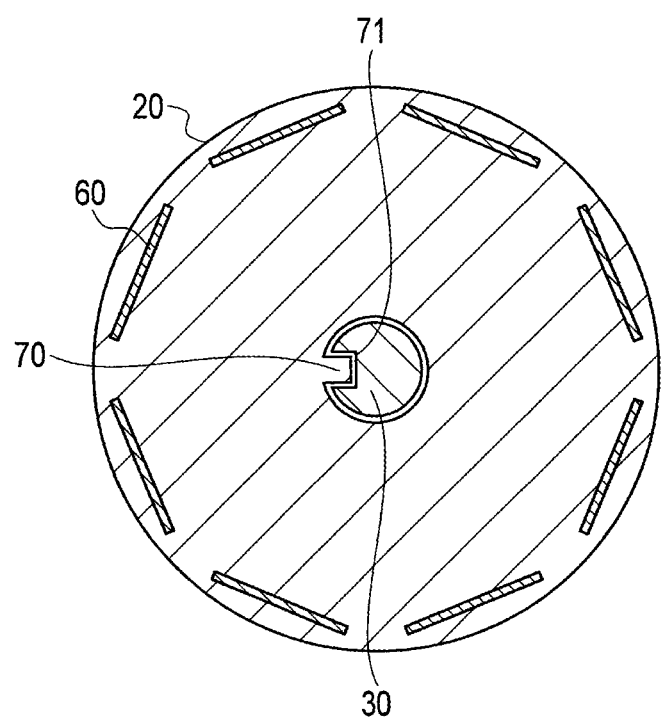
FIG. 2 is a cross-sectional view taken along line A-A shown in FIG. 1(b).

Next, the process of fitting the rotor core 20 and the shaft 30 together is described below with reference to FIG. 2. As shown in FIG. 2, the rotor core 20 is provided with a projection 70 on the inner surface thereof, and the shaft 30 is provided with a recess 71 on the outer surface thereof. The rotor core 20 and the shaft 30 are fitted together by mutual engagement between the projection 70 and the recess 71.

The rotor core 20 may be provided with a recess, and the shaft 30 may be provided with a projection.

The first embodiment exemplifies the case in which the rotor core 20 and the shaft 30 are fitted by clearance fit, but may be applied to the case of transition fit such as light interference fit.

Next, the route of rotational force of the rotor core 20 transmitted to the shaft 30 is described below.

The rotational force of the rotor core 20 is transmitted to the retainer 41 in contact with the rotor core 20, transmitted to the retainer 40 in contact with the retainer 41, and transmitted to the shaft 30 fastened by the retainer 40. The transmitted force is static frictional force calculated as the product of a coefficient of static friction by vertical drag force. When the rotational force of the rotor core 20 exceeds the maximum static frictional force, the rotor core 20 and the shaft 30 cause a relative slide.

Since the maximum static frictional force is generally larger than dynamic frictional force, the rotor core 20 is relatively accelerated, as compared with the shaft 30, by a force difference between the maximum static frictional force and the dynamic frictional force. The rotor core 20 comes into contact with the shaft 30 on the respective side surfaces of the projection and the recess, so as to immediately cause a great impact between the side surfaces of the projection and the recess.

The impact caused between the side surfaces of the projection and the recess may be reduced in such a manner as to prolong the time from the point when the rotor core 20 impacts against the shaft 30 to the point when the rotor core 20 stops while gradually decelerating after the impact, or decrease relative kinetic energy between the rotor core 20 and the shaft 30.

Figure 3:
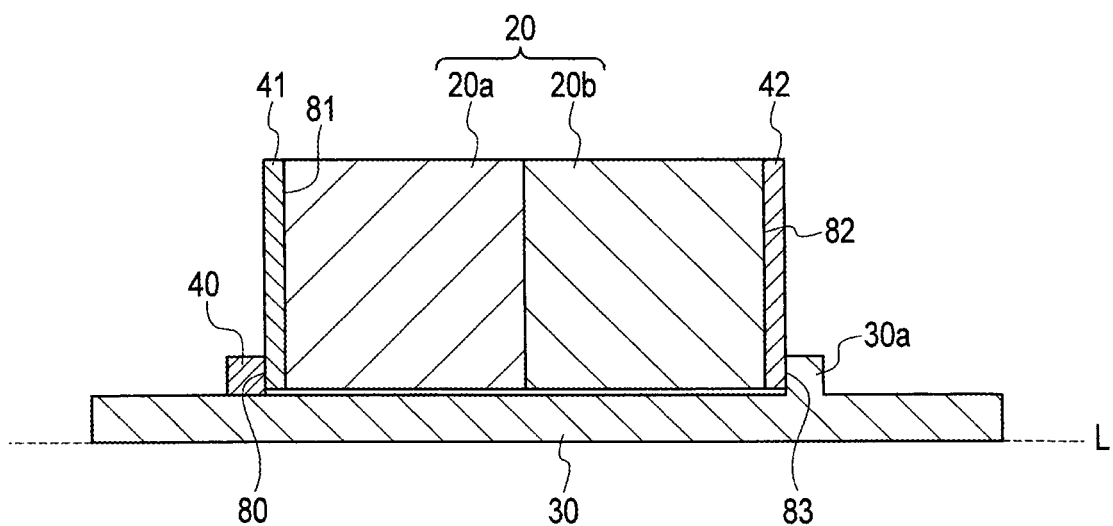
FIG. 3 is a cross-sectional view taken along line B-B shown in FIG. 1(b).

The first embodiment subjects, to lubrication treatment, a sliding surface 80 provided between the retainer 40 and the retainer 41, a sliding surface 81 provided between the retainer 41 and the core block 20a, a sliding surface 82 provided between the core block 20b and the retainer 42, and a sliding surface 83 provided between the retainer 42 and the flange 30a of the shaft 30, as shown in FIG. 3, in order to decrease the relative kinetic energy between the rotor core 20 and the shaft 30.

Figure 4:
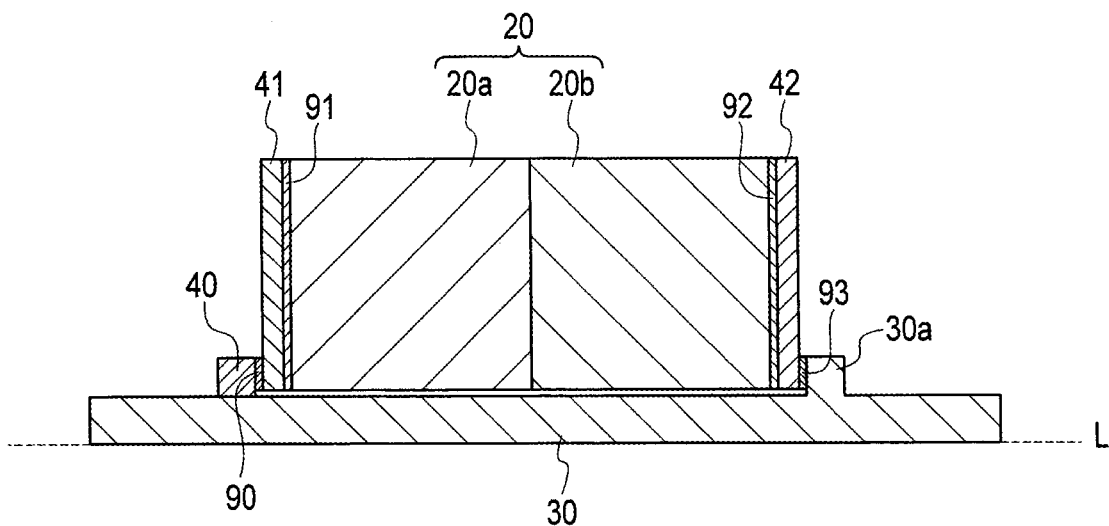
FIG. 4 is a view for illustrating lubrication treatment according to the first embodiment of the present invention.

Next, an example of the lubrication treatment is described with reference to FIG. 4. The lubrication treatment according to the first embodiment is to apply lubricants 90 to 93 to the sliding surfaces 80 to 83 shown in FIG. 3. According to the first embodiment, the lubricants 90 to 93 are applied to the sliding surfaces 80 to 83 so that the maximum static frictional force of the sliding surface 80, namely, the coefficient of static friction of the sliding surface 80 is the smallest of the other three sliding surfaces 81, 82, and 83. The lubricant used may be fluoropolymer.

The rotor structure according to the first embodiment can reduce the static frictional force of the respective sliding surfaces 80 to 83 by applying the lubricant thereto, so as to minimize a difference between the static frictional force and the dynamic frictional force. The rotor structure according to the first embodiment can lead to a relative slide between the rotor core 20 and the shaft 30 with smaller rotational force than a case not subjected to lubrication treatment. Since the rate of acceleration decreases as the force upon sliding decreases, the relative velocity immediately before the impact between the projection 70 and the recess 71 also decreases. Accordingly, the rotor structure according to the first embodiment can reduce the relative kinetic energy between the rotor core 20 and the shaft 30, so as to reduce the impact caused between the respective side surfaces of the projection and the recess.

Further, the rotor structure according to the first embodiment subjects the respective sliding surfaces 80 to 83 to the lubrication treatment such that the maximum static frictional force of the sliding surface 80 is the smallest of the other three sliding surfaces 81, 82, and 83. Accordingly, the rotor structure according to the first embodiment can further reduce the relative kinetic energy between the rotor core 20 and the shaft 30 to reduce the impact caused between the side surfaces of the projection and the recess.

As an alternative way to lead the maximum static frictional force of the sliding surface 80 to the smallest instead of the lubrication treatment, materials used for the respective elements included in the rotor 10 may be varied and selected as appropriate, or the surface configuration of the respective elements may physically be smoothed.

Second Embodiment

A second embodiment of the present invention will be described below with reference to FIG. 5. The second embodiment differs from the first embodiment in reducing the number of the sliding surfaces subjected to lubrication treatment.

Figure 5:
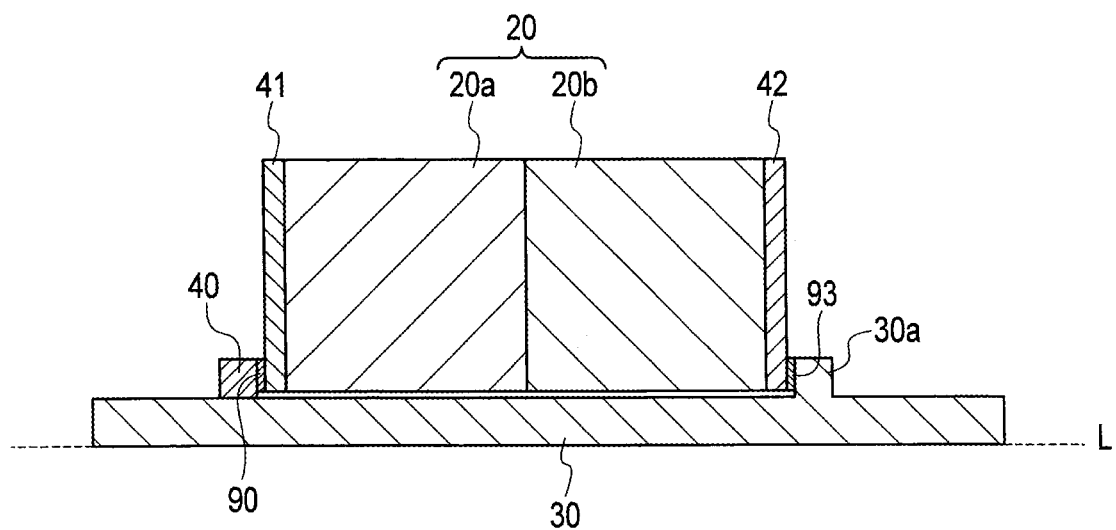
FIG. 5 is a view for illustrating lubrication treatment according to a second embodiment of the present invention.

In the second embodiment, as shown in FIG. 5, the retainer 41 and the core block 20a are fixed together with an adhesive, and the core block 20b and the retainer 42 are fixed together with an adhesive. Accordingly, the sliding surfaces provided on the respective retainers 41 and 42 are reduced to the sliding surfaces 80 and 83 shown in FIG. 3. Namely, the number of the sliding surfaces subjected to lubrication treatment is reduced from four to two.

The rotor structure according to the second embodiment can reduce costs by reducing the number of the sliding surfaces subjected to lubrication treatment. Since the rotor structure according to the second embodiment includes two sliding surfaces subjected to lubrication treatment, the thickness of films formed by the lubrication treatment can easily be controlled. The rotor structure according to the second embodiment therefore can easily smooth the films formed of the lubricant on the sliding surfaces 80 and 83, so as to reduce and stabilize the rotational force necessary for sliding due to equalized surface pressure on the retainers 40 and 41.

In the second embodiment, the lubrication treatment may be performed such that the maximum static frictional force of the sliding surface 80, namely, the coefficient of static friction of the sliding surface 80 is the same as that of the sliding surface 83. Accordingly, the rotor core 20 of the second embodiment can slide more smoothly.

Third Embodiment

A third embodiment of the present invention will be described below with reference to FIG. 6. The third embodiment differs from the second embodiment in further reducing the number of the sliding surfaces subjected to lubrication treatment.

Figure 6:
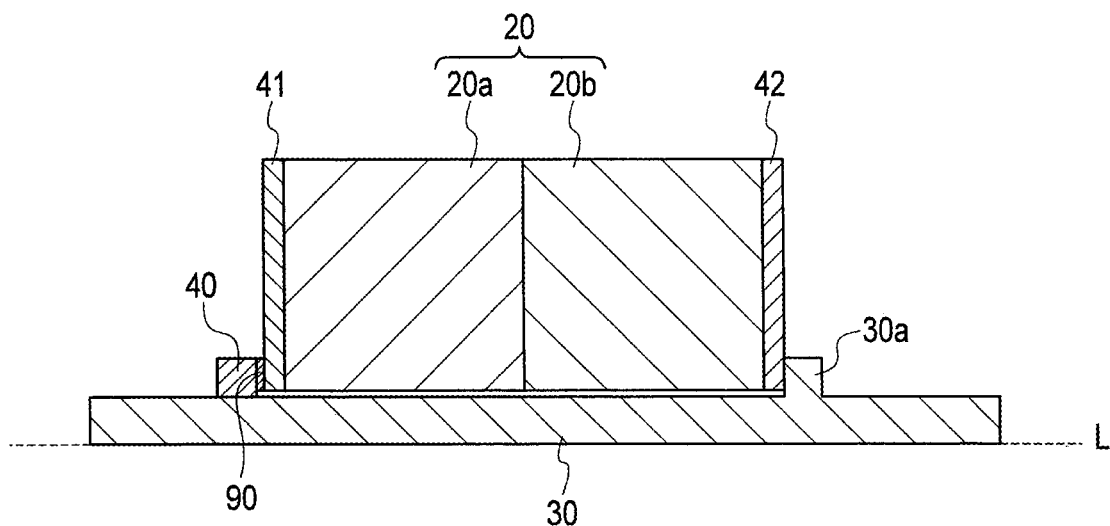
FIG. 6 is a view for illustrating lubrication treatment according to a third embodiment of the present invention.

The third embodiment subjects only the sliding surface 80 between the retainer 40 and the retainer 41 to lubrication treatment, as shown in FIG. 6.

When the rotor core 20 starts rotating, the end of the rotor core 20 subjected to lubrication treatment (hereinafter, referred to as the treated end) immediately starts sliding because of low static frictional force. The other end of the rotor core 20 not subjected to lubrication treatment (hereinafter, referred to as the untreated end) is fixed to the shaft 30 until the rotational force of the rotor core 20 exceeds the static frictional force. Since the rotor core 20 is formed of thin electromagnetic steel plates stacked on one another, the rotor core 20 is apt to cause torsion in the rotating direction, and the treated end slowly rotates until the projection and the recess engage with each other. Since the projection 70 and the recess 71 at the treated end have already been engaged together when the rotational force of the rotor core 20 exceeds the static frictional force at the untreated end, the impact on the side surfaces of the projection and the recess is reduced. Further, the rotor structure according to the third embodiment can reduce costs since only one sliding surface is subjected to the lubrication treatment.

The film thickness derived from the lubricant applied by the lubrication treatment may vary depending on the sliding surfaces. For example, the sliding surface 82 shown in FIG. 3 has a wide contact area, and is applied with surface pressure highest in the middle thereof due to the load applied from the flange 30a. The sliding surface 83 has low resistance to abrasion progressing faster on the sliding surface 83 than on the sliding surface 82, since the sliding surface 83 is applied with surface pressure highest at the edge thereof due to the load applied from the flange 30a. Thus, the use of a harder lubricant on the sliding surface 83 or the increase of thickness of the film formed on the sliding surface 83 can minimize the progress of the abrasion. Accordingly, an appropriate lubrication treatment varied depending on the sliding surfaces can achieve the rotor 10 with a longer life and higher durability.

Figure 7:
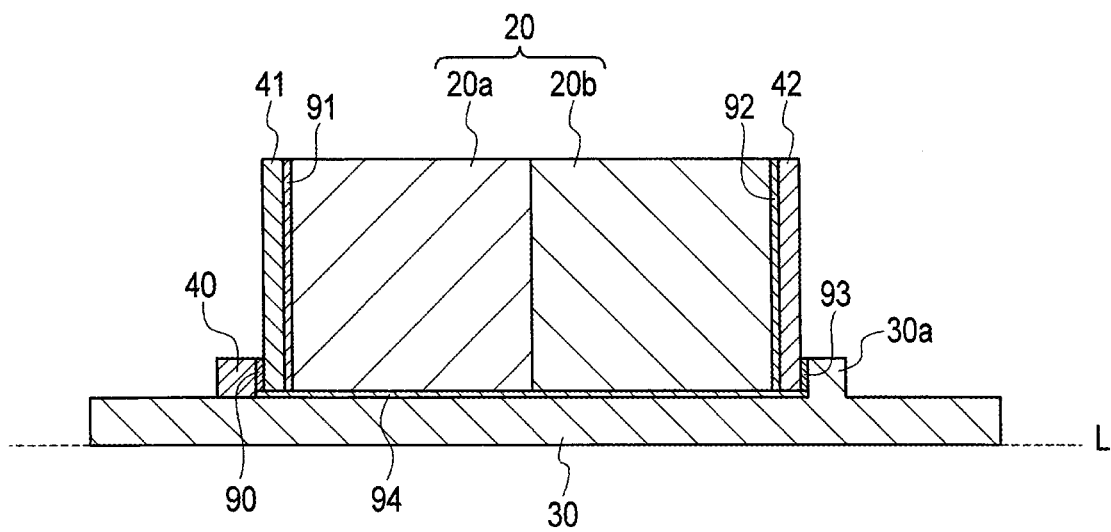
FIG. 7 is a view for illustrating lubrication treatment according to another embodiment of the present invention.

When the rotor core 20 and the shaft 30 are fitted by transition fit, a sliding surface is provided between the rotor core 20 and the shaft 30. As shown in FIG. 7, a lubricant 94 may be applied to the sliding surface between the rotor core 20 and the shaft 30. Accordingly, the static frictional force on the sliding surface between the rotor core 20 and the shaft 30 can be reduced. The rotor core 20 and the shaft 30 fitted by clearance fit may also be subjected to lubrication treatment in the gap therebetween.

The lubrication treatment described above may be a treatment with a solid lubricant in which a surface is coated with graphite or fluoropolymer. This treatment does not require a circulatory system for the solid lubricant, so as to simplify the structures of the rotor 10 and the rotary electric machine. Further, the treatment with the solid lubricant does not require replacement or supplementation of the lubricant because of degradation, so as to reduce costs necessary for maintenance of the rotor 10.

While the embodiments of the present invention have been described above, it should be understood that the present invention is not intended to be limited to the descriptions and the drawings composing part of this disclosure. Various alternative embodiments, examples, and technical applications will be apparent to those skilled in the art according to this disclosure.

REFERENCE SIGNS LIST

10 ROTOR
20 ROTOR CORE
30 SHAFT
40, 41, 42 RETAINER
80, 81, 82, 83 SLIDING SURFACE

The invention claimed is:

1. A rotor structure for a rotary electric machine in which an inner surface of a hollow rotor core and an outer surface of a shaft inserted into a hole of the rotor core are fitted together by mutual engagement between a projection and a recess to compose a rotor, the rotor structure comprising:
    a first retainer brought into contact with one end of the rotor core; and
    a second retainer brought into contact with a surface of the first retainer opposite to a surface in contact with the rotor core so as to fix the first retainer and the rotor core to the shaft,
    wherein a coefficient of static friction of a first sliding surface between the first retainer and the second retainer is smaller than any other sliding surface provided in the rotor.

2. The rotor structure for the rotary electric machine according to claim 1, wherein the first sliding surface is subjected to lubrication treatment so as to have the smaller coefficient of static friction than any other sliding surface provided in the rotor.

3. The rotor structure for the rotary electric machine according to claim 1, further comprising a third retainer provided at another end of the rotor core,
    wherein a second sliding surface between a flange provided on the shaft and the third retainer is subjected to lubrication treatment.

4. The rotor structure for the rotary electric machine according to claim 3, wherein the coefficient of static friction of the first sliding surface is identical to a coefficient of static friction of the second sliding surface.

5. The rotor structure for the rotary electric machine according to claim 3, wherein a third sliding surface between the first retainer and the rotor core and a fourth sliding surface between the third retainer and the rotor core are subjected to lubrication treatment.

6. The rotor structure for the rotary electric machine according to claim 5, wherein a thickness of a film formed on the fourth sliding surface by the lubrication treatment is thinner than a thickness of a film formed on the second sliding surface by the lubrication treatment.

7. The rotor structure for the rotary electric machine according to claim 1, wherein a fifth sliding surface provided between the rotor core and the shaft is subjected to lubrication treatment.

8. The rotor structure for the rotary electric machine according to claim 2, wherein the lubrication treatment is a treatment with a solid lubricant.

* * * * *